(12) United States Patent
Tsuchida et al.

(10) Patent No.: US 10,135,307 B2
(45) Date of Patent: Nov. 20, 2018

(54) ROTOR, PERMANENT-MAGNET-EMBEDDED MOTOR, AND COMPRESSOR

(71) Applicant: Mitsubishi Electric Corporation, Tokyo (JP)

(72) Inventors: Kazuchika Tsuchida, Tokyo (JP); Tomoaki Oikawa, Tokyo (JP); Masahiro Nigo, Tokyo (JP); Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 15/122,518

(22) PCT Filed: Apr. 28, 2014

(86) PCT No.: PCT/JP2014/061869
§ 371 (c)(1),
(2) Date: Aug. 30, 2016

(87) PCT Pub. No.: WO2015/166532
PCT Pub. Date: Nov. 5, 2015

(65) Prior Publication Data
US 2017/0098970 A1    Apr. 6, 2017

(51) Int. Cl.
*H02K 1/27*         (2006.01)
*H02K 21/16*        (2006.01)
*F04C 18/34*        (2006.01)
*F04C 29/00*        (2006.01)
*F04C 23/00*        (2006.01)
(Continued)

(52) U.S. Cl.
CPC .......... *H02K 1/2706* (2013.01); *F04C 18/34* (2013.01); *F04C 23/008* (2013.01);
(Continued)

(58) Field of Classification Search
CPC ............................ H02K 1/276; H02K 1/2766
(Continued)

(56) References Cited

U.S. PATENT DOCUMENTS

2008/0136280 A1*  6/2008  Hsiao ................ F04B 35/04
                                              310/114
2008/0224558 A1*  9/2008  Ionel ................ H02K 1/276
                                              310/156.57
(Continued)

FOREIGN PATENT DOCUMENTS

JP    07-336917 A    12/1995
JP    09-019120 A     1/1997
(Continued)

OTHER PUBLICATIONS

International Search Report of the International Searching Authority dated Jun. 3, 2014 for the corresponding international application No. PCT/JP2014/061869 (and English translation).
(Continued)

*Primary Examiner* — Terrance Kenerly
(74) *Attorney, Agent, or Firm* — Posz Law Group, PLC

(57) ABSTRACT

An end of each of slits of a rotor on a magnet insertion hole side has a triangular shape. A slit inner-side line of each of the slits includes an apex and a pair of side ends. An interval between each of the pair of side ends and the magnet insertion hole is larger than an interval between the apex and the magnet insertion hole, and an interval between the apex and the magnet insertion hole is larger than a plate thickness of each of steel plates forming a rotor core.

4 Claims, 6 Drawing Sheets

(51) Int. Cl.
*H02K 29/03* (2006.01)
*F04C 18/356* (2006.01)

(52) U.S. Cl.
CPC ......... *F04C 29/0085* (2013.01); *H02K 1/276* (2013.01); *H02K 21/16* (2013.01); *H02K 29/03* (2013.01); *F04C 18/356* (2013.01); *F04C 2210/263* (2013.01); *F04C 2210/268* (2013.01); *H02K 2213/03* (2013.01)

(58) Field of Classification Search
USPC ........................................ 310/156.53, 156.56
See application file for complete search history.

(56) References Cited

U.S. PATENT DOCUMENTS

| | | | | |
|---|---|---|---|---|
| 2010/0026128 | A1* | 2/2010 | Ionel | H02K 1/276 310/156.53 |
| 2012/0112593 | A1* | 5/2012 | Araki | H02K 1/276 310/156.57 |
| 2013/0307363 | A1* | 11/2013 | Sano | H02K 1/2766 310/156.01 |
| 2014/0232231 | A1* | 8/2014 | Yabe | H02K 1/276 310/156.51 |

FOREIGN PATENT DOCUMENTS

| | | |
|---|---|---|
| JP | H09-163647 A | 6/1997 |
| JP | 2001-037186 A | 2/2001 |
| JP | 2005-245148 A | 9/2005 |
| JP | 2008-167583 A | 7/2008 |
| JP | 2013-126291 A | 6/2013 |

OTHER PUBLICATIONS

Office Action dated Apr. 25, 2017 issued in corresponding JP patent application No. 2016-515780 (and English translation).

* cited by examiner

ROTOR, PERMANENT-MAGNET-EMBEDDED MOTOR, AND COMPRESSOR

CROSS REFERENCE TO RELATED APPLICATIONS

This application is a U.S. national stage application of PCT/JP2014/061869 filed on Apr. 28, 2014, the contents of which are incorporated herein by reference.

TECHNICAL FIELD

The present invention relates to a rotor, an interior permanent magnet motor, and a compressor.

BACKGROUND ART

As a related-art interior permanent magnet motor, in Patent Literature 1, there is disclosed an interior permanent magnet motor having a plurality of slits formed in a rotor at a radially outer side with respect to each of magnet insertion holes. In the interior permanent magnet motor, it is expected that a harmonic component of a magnetic-flux density waveform is reduced due to a function of the slits so that a harmonic of an inducted voltage and a cogging torque are reduced, thereby reducing noise and vibration.

CITATION LIST

Patent Literature

[PTL 1] JP 2005-245148 A

SUMMARY OF INVENTION

Technical Problem

However, in the configuration disclosed in Patent Literature 1, some of the slits are connected to each of the magnet insertion holes, and the connection portion of each of the slits is gradually increased in width as approaching to a rotor outer peripheral portion. Thus, a magnet surface side of the connection portion becomes an air region, and accordingly, the utilization efficiency of a magnetic flux generated from a magnet may be degraded.

The present invention has been made in view of the above, and has an object to provide a rotor, which is capable of reducing noise and vibration while reducing a loss of a magnetic flux generated from a magnet.

Solution to Problem

In order to achieve the above-mentioned object, according to one embodiment of the present invention, there is provided a rotor, including: a rotor core; a shaft; and a plurality of permanent magnets, in which the rotor core is formed by laminating a plurality of steel plates, in which the rotor core has a plurality of magnet insertion holes, in which at least one slit is formed between an outer peripheral surface of the core and an outer-side line of at least one of the magnet insertion holes, in which an end of the slit on the magnet insertion hole side has a triangular shape as viewed in a plane having a rotation center line as a normal, in which the triangular shape projects toward the magnet insertion hole side, in which a slit inner-side line of the slit includes: an apex of the triangular shape; two sides of the triangular shape, which form the apex; and a pair of side ends being ends opposite to the apex of the two respective sides, in which an interval between each of the pair of side ends of the slit and the magnet insertion hole is larger than an interval between the apex of the slit and the magnet insertion hole, and in which the interval between the apex and the magnet insertion hole is larger than a plate thickness of each of the steel plates forming the rotor core.

Further, in order to achieve the same object, according to one embodiment of the present invention, there is provided an interior permanent magnet motor, including: a stator; and the above-mentioned rotor of the one embodiment of the present invention, which is rotatably arranged so as to be opposed to the stator.

Further, in order to achieve the same object, according to one embodiment of the present invention, there is provided a compressor, including, in an airtight container: the above-mentioned interior permanent magnet motor of the one embodiment of the present invention; and a compression element.

Advantageous Effects of Invention

According to the present invention, it is possible to reduce noise and vibration while reducing the loss of the magnetic flux generated from the magnet.

DESCRIPTION OF EMBODIMENTS

Figure 1:
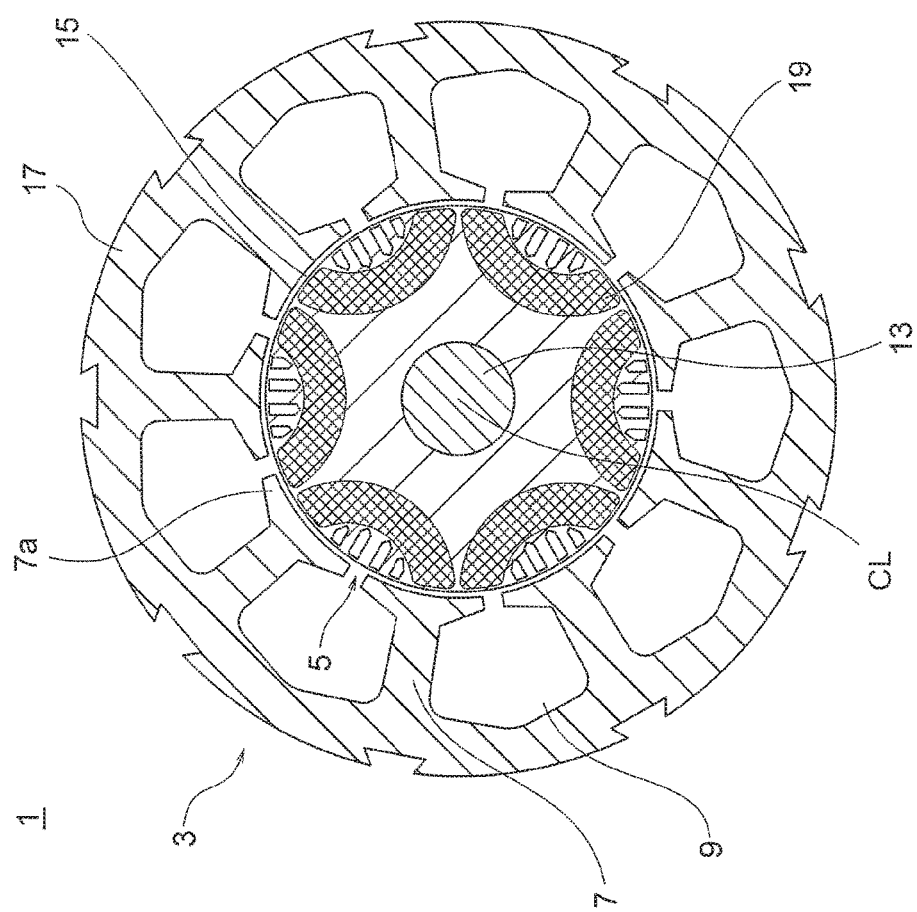
FIG. 1 is a view for illustrating a cross section orthogonal to a rotation center line of an interior permanent magnet motor according to a first embodiment of the present invention.

Now, embodiments of the present invention are described referring to the accompanying drawings. Note that, in the drawings, the same reference symbols represent the same or corresponding parts.

First Embodiment

Figure 2:
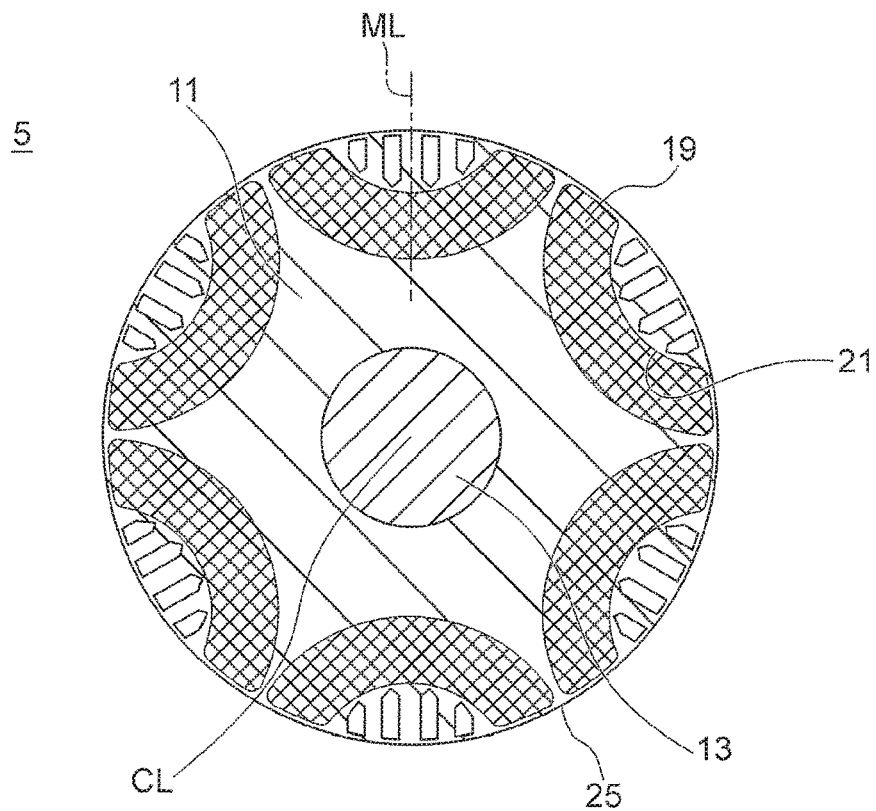
FIG. 2 is a view for illustrating a rotor of the interior permanent magnet motor in FIG. 1.
Figure 3:
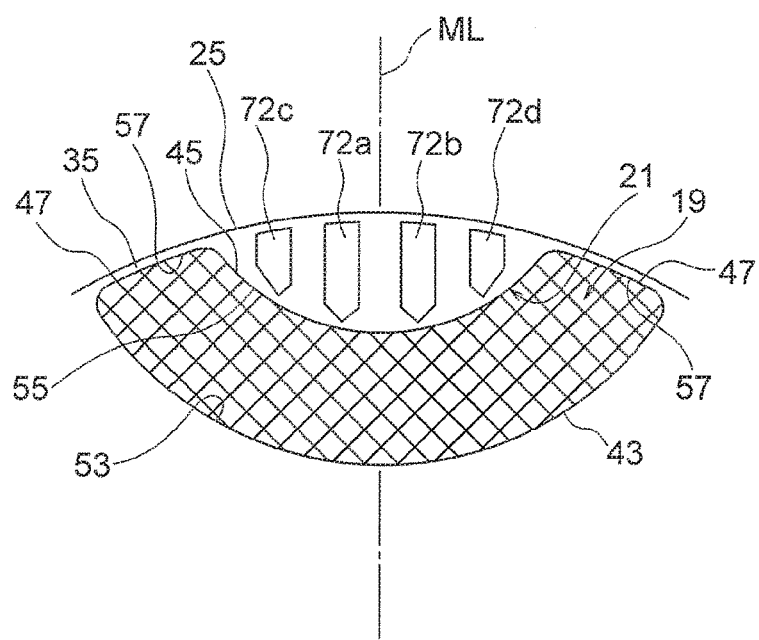
FIG. 3 is a view for illustrating a peripheral portion of one permanent magnet of the rotor in FIG. 2 in an enlarged manner.
Figure 4:
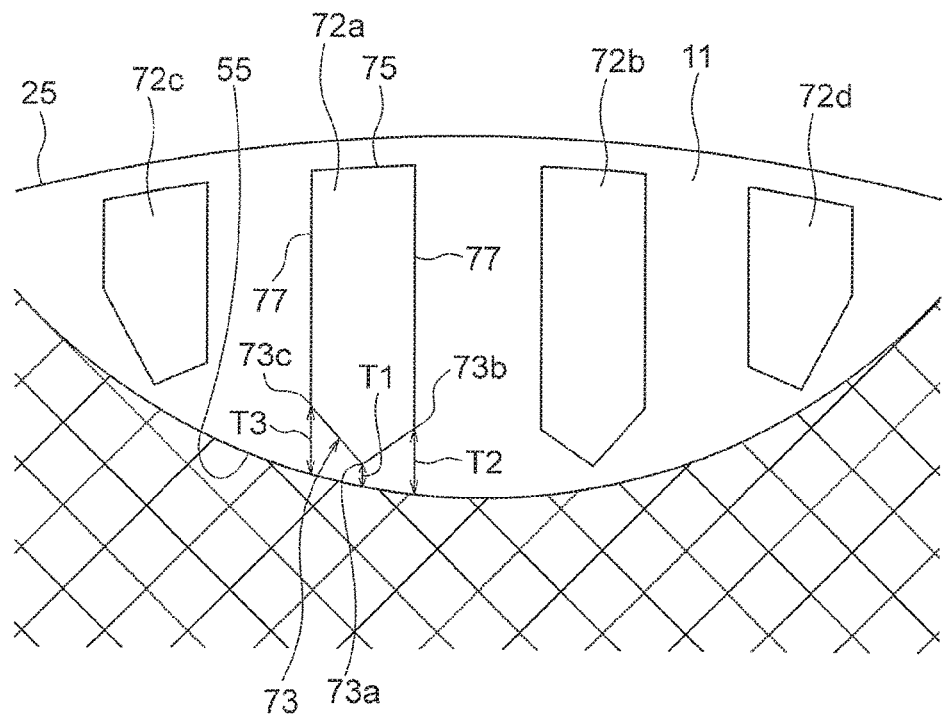
FIG. 4 is a view for illustrating a plurality of slits in FIG. 3 in an enlarged manner.

FIG. 1 is a view for illustrating a cross section orthogonal to a rotation center line of an interior permanent magnet motor according to a first embodiment of the present invention. FIG. 2 is a view for illustrating a rotor of the interior permanent magnet motor in FIG. 1. FIG. 3 is a view for illustrating a peripheral portion of one permanent magnet of the rotor in FIG. 2 in an enlarged manner. FIG. 4 is a view for illustrating a plurality of slits in FIG. 3 in an enlarged manner.

An interior permanent magnet motor 1 includes a stator 3 and a rotor 5 rotatably arranged so as to be opposed to the stator. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly-known stator winding (not shown) is wound around each of the plurality of tooth portions 7 in a publicly-known pattern.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between a core outer peripheral surface 25 of the rotor 5 and an inner peripheral surface of the stator 3.

In such a configuration, the rotor 5 is held on an inner side of the stator 3 through intermediation of the air gap 15 so as to be rotatable about a rotation center line CL. Specifically, a current having a frequency synchronized with an instructed number of revolutions is supplied to the stator 3 to generate a rotation magnetic field, thereby rotating the rotor 5.

Next, configurations of the stator 3 and the rotor 5 are described in detail. The stator 3 includes a stator core 17. The stator core 17 is formed by punching relatively thin magnetic steel plates into a predetermined shape, and laminating a predetermined number of the magnetic steel plates while fastening the magnetic steel plates by caulking.

The stator core 17 includes nine slot portions 9 formed in a radial fashion on a radially inner side thereof so as to be arranged approximately at equal intervals in the circumferential direction. A region of the stator core 17, which is located between the adjacent slot portions 9, is referred to as "tooth portion 7". Each of the tooth portions 7 extends in a radial direction and projects toward the rotation center line CL. Further, a most part of each of the tooth portions 7 has an approximately equal circumferential width from a radially outer side to a radially inner side. A tooth tip portion 7a is formed at a distal end of the tooth portion 7, which is located on a radially innermost side. Each of the tooth tip portions 7a is formed in an umbrella-like shape having both side portions increased in the circumferential direction.

The stator windings (not shown) that form coils (not shown) configured to generate a rotation magnetic field are wound around the tooth portions. The coil is formed by directly winding a magnet wire around a magnetic pole tooth through intermediation of an insulating member. This winding method is called "concentrated winding". The coils are connected in a three-phase Y configuration. The number of turns and a wire diameter of the coil are determined in accordance with required characteristics (such as the number of revolutions and a torque), voltage specifications, and the sectional area of the slot. In this case, divided teeth are developed in a band-like fashion so as to facilitate winding. A magnet wire having an appropriate wire diameter is wound around each magnetic pole tooth to make a predetermined number of turns. After the winding, the divided teeth are formed into an annular shape, which are then welded to form the stator.

Similarly to the case of the stator core 17, the rotor core 11 is also formed by punching relatively thin magnetic steel plates (for example, each having a thickness approximately equal to that of each of the magnetic steel plates of the stator core 17) into a predetermined shape, and laminating a predetermined number of the magnetic steel plates while fastening the magnetic steel plates by caulking.

A plurality of permanent magnets 19 (six permanent magnets 19 in this specific example), which are magnetized so that the N poles and the S poles are alternately located, are arranged in the rotor core 11. As illustrated in FIG. 1 and FIG. 2, each of the permanent magnets 19 is curved into an arc shape, and is arranged so that a convex portion side of the arc shape faces a center side of the rotor 5.

In more detail, (six) magnet insertion holes 21 as many as the number of the plurality of (six) permanent magnets 19 are formed in the rotor core 11. The corresponding permanent magnets 19 are inserted into the plurality of magnet insertion holes 21, respectively. That is, the plurality of permanent magnets 19 and the plurality of magnet insertion holes 21 are each formed into an arc shape that is convex toward the center side of the rotor 5. Further, as illustrated in FIG. 1 and FIG. 2, one permanent magnet 19 is inserted into one magnet insertion hole 21. Note that, the number of magnetic poles of the rotor 5 may be any number as long as the number is two or more. The case of six poles is exemplified in this embodiment.

In the present invention, at least one slit is required to be formed between the core outer peripheral surface 25 of the rotor 5 and a hole outer-side line of each of the magnet insertion holes 21, which is described later. In the first embodiment, as an example thereof, a plurality of slits (more specifically, four slits) are formed for each of the six magnetic poles.

Next, mainly referring to FIG. 3, details of the permanent magnets and the magnet insertion holes are described. Each of the permanent magnets 19 has an inner-side contour surface 43, an outer-side contour surface 45, and a pair of side contour surfaces 47 as viewed in a plane having the rotation center line CL as the normal. The "outer side" and the "inner side" of the inner-side contour surface and the outer-side contour surface indicate any of a radially inner side and a radially outer side through relative comparison as viewed in the plane having the rotation center line CL as the normal.

Each of the magnet insertion holes 21 includes a hole inner-side line 53, a hole outer-side line 55, and a pair of hole side lines 57 as a profile of the hole as viewed in the plane having the rotation center line CL as the normal. The "outer side" and the "inner side" of the hole inner-side line and the hole outer-side line also indicate any of the radially inner side and the radially outer side through relative comparison as viewed in the plane having the rotation center line CL as the normal.

The hole outer-side line 55 is formed by a first arc having a first arc radius. The hole inner-side line 53 is formed by a second arc having a second arc radius larger than the first arc radius. The first arc radius and the second arc radius have a common radius center. The common radius center is present on the radially outer side of the permanent magnet 19 and the magnet insertion hole 21 and is located on a corresponding magnetic pole center line ML. In other words, the hole inner-side line 53 and the hole outer-side line 55 are formed concentrically so that a center of the first arc surface and a center of the second arc surface coincide with an orientation center (orientation focus) of the permanent magnet.

The pair of side contour surfaces 47 each connect a corresponding end of the inner-side contour surface 43 and a corresponding end of the outer-side contour surface 45 to each other in FIG. 3, whereas the pair of hole side lines 57 each connect a corresponding end of the hole inner-side line 53 and a corresponding end of the hole outer-side line 55 to each other in FIG. 3.

Portions of the rotor core 11, which are located between the core outer peripheral surface 25 and the respective hole side lines 57 of each of the magnet insertion holes 21, correspond to inter-pole thin portions 35 each having a uniform thickness. Those inter-pole thin portions 35 each serve as a path for a leakage magnetic flux between the adjacent magnetic poles, and hence it is preferred that the inter-pole thin portions 35 each have as small a thickness as possible. In this case, as an example, the inter-pole thin portions 35 are each set approximately as large as the plate thickness of the magnetic steel plate, as a minimum press-working allowable width.

Next, referring to FIG. 3 and FIG. 4, the details of the slits are described. Four slits 72*a*, 72*b*, 72*c*, and 72*d* all extend in a direction parallel to the corresponding magnetic pole center line ML, and are holes passing through the rotor core 11 in a direction of the rotation center line CL.

As viewed in the plane having the rotation center line CL as the normal, each of the slits 72*a*, 72*b*, 72*c*, and 72*d* includes a slit inner-side line 73, a slit outer-side line 75, and a pair of slit side lines 77 as a profile of the slit. The "outer side" and the "inner side" of the slit inner-side line and the slit outer-side line also indicate any of the radially inner side and the radially outer side through relative comparison as viewed in the plane having the rotation center line CL as the normal.

An end of each of the slits 72*a*, 72*b*, 72*c*, and 72*d* on the magnet insertion hole side has a triangular shape. That is, the slit inner-side line 73 of each of the slits 72*a*, 72*b*, 72*c*, and 72*d* includes an apex 73*a* of the triangular shape that is convex toward the magnet insertion hole 21 side, two sides of the triangular shape, which form the apex 73*a*, and a pair of side ends 73*b* and 73*c* being ends opposite to the apex of the respective two sides. Further, as an example, in the first embodiment, the above-mentioned triangular shape is an isosceles triangular shape. The slit inner-side line 73 is formed to be line symmetric across an imaginary line extending in parallel to the corresponding magnetic pole center line ML and passing through the apex 73*a*.

The slit outer-side line 75 extends substantially along the core outer peripheral surface 25. Further, the pair of slit side lines 77 extend along the corresponding magnetic pole center line ML. Ends of the slit inner-side line 73, which are connected to the pair of slit side lines 77, correspond to the above-mentioned pair of side ends 73*b* and 73*c*.

That is, the end of each of the slits 72*a*, 72*b*, 72*c*, and 72*d* on the magnet insertion hole side includes the apex 73*a* and the pair of side ends 73*b* and 73*c*. As viewed in the plane having the rotation center line CL as the normal, intervals (intervals in a direction of the corresponding magnetic pole center line ML) T2 and T3 between the pair of side ends 73*b* and 73*c* of each of the slits 72*a*, 72*b*, 72*c*, and 72*d* and the hole outer-side line 55 of the magnet insertion hole 21 are larger than an interval (interval in the direction of the corresponding magnetic pole center line ML) T1 between the apex 73*a* and the hole outer-side line 55 of the magnet insertion hole 21 (T1<T2 and T1<T3). Further, the interval T1 between the apex 73*a* of each of the slits 72*a*, 72*b*, 72*c*, and 72*d* and the hole outer-side line 55 of the magnet insertion hole 21 is larger than the plate thickness of each of the magnetic steel plates forming the rotor core 11.

Next, actions of the first embodiment, which are obtained by providing the above-mentioned slits, are described referring to FIG. 5 to FIG. 9.

Figure 5:
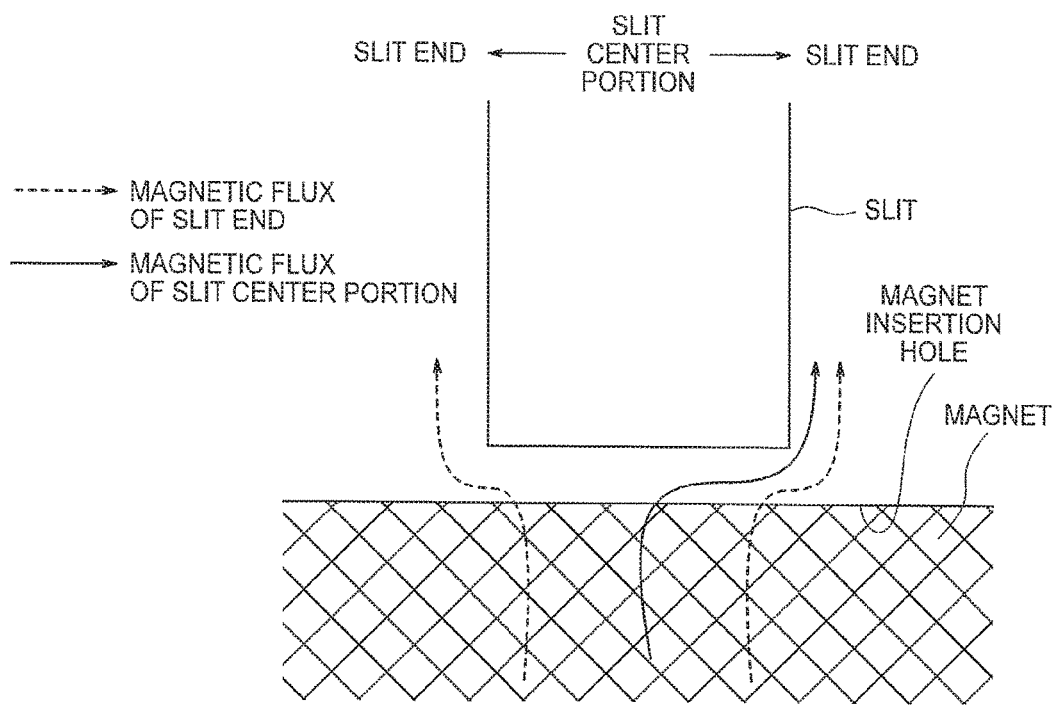
FIG. 5 is a schematic view for illustrating flow of a magnetic flux when an interval between an end of the slit on a magnet insertion hole side and the magnet insertion hole is constant.

First, to briefly describe the actions of this embodiment, a mode in which the interval between the magnet insertion hole and the slit inner-side line is constant is illustrated in FIG. 5. When a slit intended to reduce noise is arranged, a magnetic flux on the slit end side passes through the rotor core so as to avoid the slit. A magnetic flux at the slit center portion also passes through the rotor so as to avoid the slit. Thus, when the thickness between the magnet insertion hole and the slit is small, magnetic saturation is caused to generate a loss of the magnetic flux.

Figure 6:
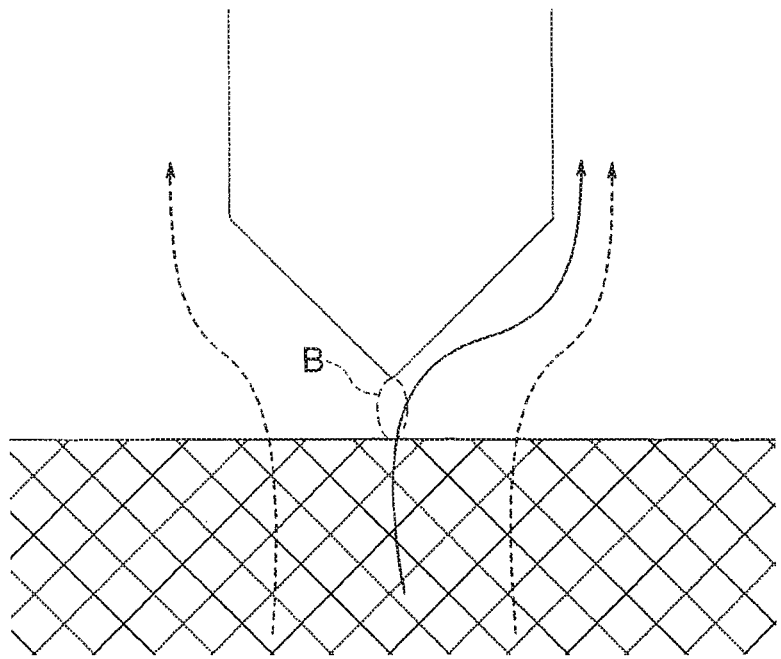
FIG. 6 is a schematic view for illustrating flow of a magnetic flux when the end of the slit on the magnet insertion hole side has a triangular shape.

In view of the above, as illustrated in FIG. 6, the end of the slit on the magnet insertion hole side is formed into a triangular shape. Thus, the interval between the end of the slit on the magnet insertion hole side and the magnet insertion hole is increased as approaching from the center portion to the ends in a slit width direction (direction orthogonal to the corresponding magnetic pole center line ML), and a magnetic flux generated from a magnet facing the center portion in the slit width direction can be efficiently taken into the rotor core with a low loss.

Figure 7:
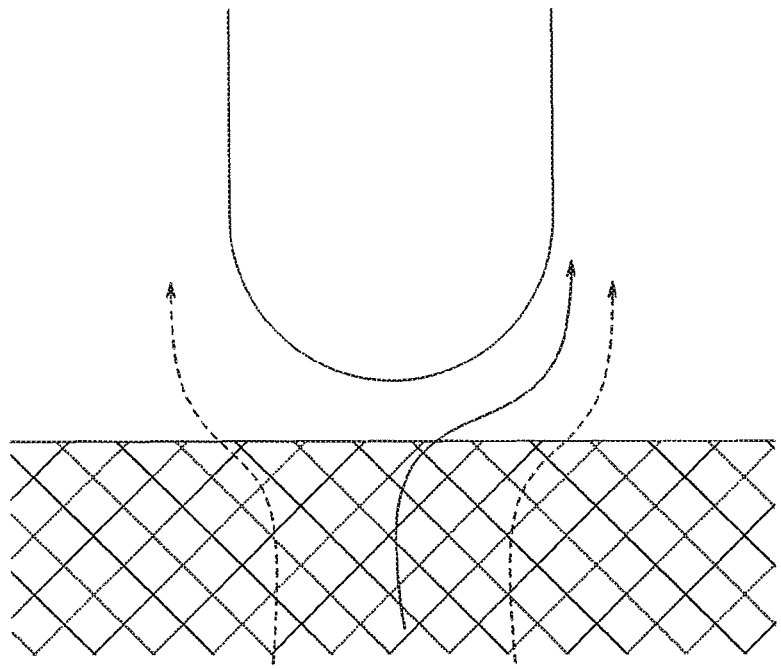
FIG. 7 is a schematic view for illustrating flow of a magnetic flux when the end of the slit on the magnet insertion hole side has an arc shape.
Figure 8:
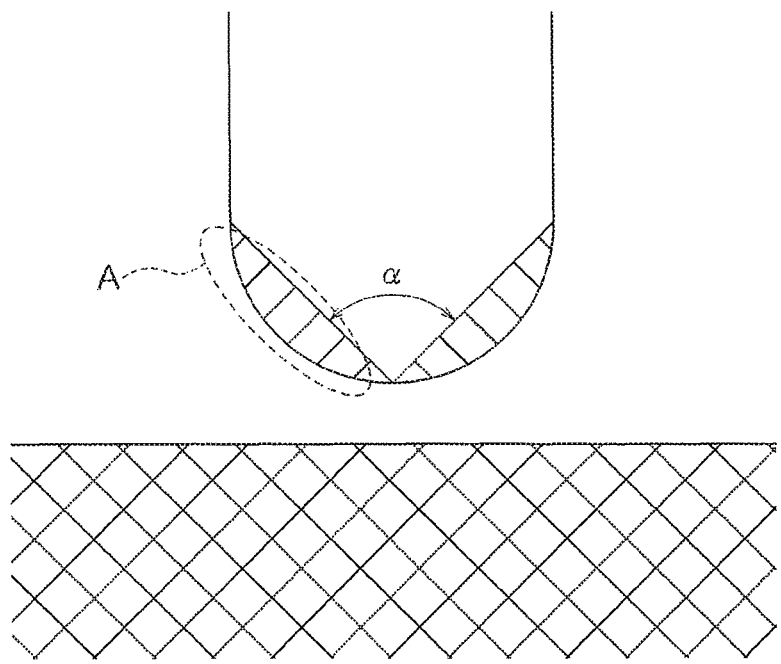
FIG. 8 is a view for illustrating comparison between the end shape of the slit in FIG. 6 and the end shape of the slit in FIG. 7 in an example of a case where an opening angle of the slit end is small.
Figure 9:
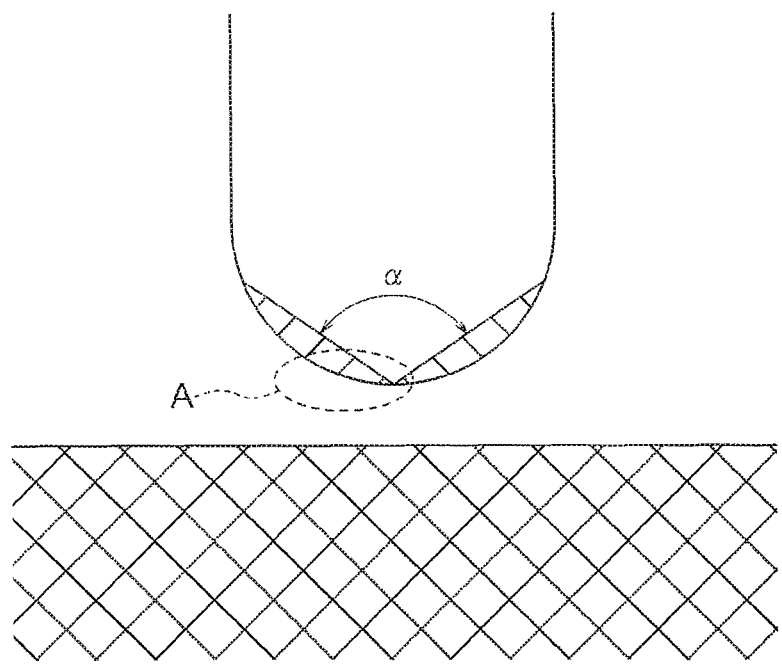
FIG. 9 is a view for illustrating comparison between the end shape of the slit in FIG. 6 and the end shape of the slit in FIG. 7 in an example of a case where the opening angle of the slit end is large.

Note that, as illustrated in FIG. 7, also through formation of the end of the slit into an arc shape, the interval between the end of the slit and the magnet insertion hole can be increased as approaching from the center portion in the slit width direction to the ends in the width direction. However, the triangular shape in FIG. 6 and the arc in FIG. 7 have the following differences. That is, as illustrated in FIG. 8, the triangular shape in FIG. 6 and the arc in FIG. 7 are different from each other in a range in the rotor core, which is occupied by the slit, by the hatched area indicated by the reference symbol A. The hatched area is generated regardless of the degree of an opening angle α (0°<α<180°) of the slit end. In FIG. 8, as an example, a mode in which the opening angle α is increased is illustrated. Also in this case, the hatched area is considerably generated. A magnetic flux of a magnet in the center portion in the slit width direction flows into the core from a thin portion B (see FIG. 6) on the center side in the slit width direction, and passes through the end sides in the slit width direction. Thus, the thickness at the center portion in the slit width direction (interval between the end of the slit on the magnet insertion hole side and the magnet insertion hole in the direction of the corresponding magnetic pole center line) is important, and it is understood that the formation of the end of the slit into a triangular shape by straight lines is effective. It is important that the end is formed by the straight lines, and the end is not necessarily required to have an isosceles triangular shape. That is, both sides in the width direction of the center portion in the slit width direction are not limited to be symmetric in the variation pattern of the thickness.

Further, the minimum thickness of each of steel plates to be laminated at the time of press working can be considered as the plate thickness of each of the steel plates to be laminated, and hence the thickness between the apex 73*a* of the triangular shape and the magnet insertion hole 21 is set to be equal to or larger than the plate thickness of each of the laminated steel plates. The end of the slit, which faces the magnet (magnet insertion hole), is formed as described above, thereby being capable of expecting an effect of reducing the loss of the magnetic flux regardless of the shape of the magnet itself.

According to the rotor and the interior permanent magnet motor including the rotor of the first embodiment, which are constructed as described above, the following excellent advantages are obtained. At least one slit is formed between the core outer peripheral surface and the hole outer-side line of the magnet insertion hole, thereby being capable of suppressing vibration and noise that may be generated due to a magnetic attraction force of the core outer peripheral surface. Further, the end of the slit on the magnet insertion hole side is formed into a triangular shape, and thus, a loss of the magnetic flux of the magnet, which is generated in a portion facing the slit, can be reduced to attain a high magnetic force. That is, noise and vibration can be reduced while reducing the loss of the magnetic flux generated from the magnet. Further, in addition to the formation of the end of the slit on the magnet insertion hole side into a triangular shape as described above, the end of the slit on the magnet insertion hole side and the magnet insertion hole are not connected through an air region (the rotor core is present between the end of the slit on the magnet insertion hole side and the magnet insertion hole over an entire width region of the slit). Thus, securement of the rigidity of the rotor core is promoted, and the loss of the magnetic flux, which may be generated due to presence of the air region between the end of the slit on the magnet insertion hole side and the magnet insertion hole, is avoided.

Second Embodiment

Next, as a second embodiment of the present invention, there is described a rotary compressor having the interior permanent magnet motor according to the above-mentioned first embodiment mounted therein. The present invention encompasses a compressor having the interior permanent magnet motor according to the above-mentioned first embodiment mounted therein. However, the type of the compressor is not limited to the rotary compressor.

Figure 10:
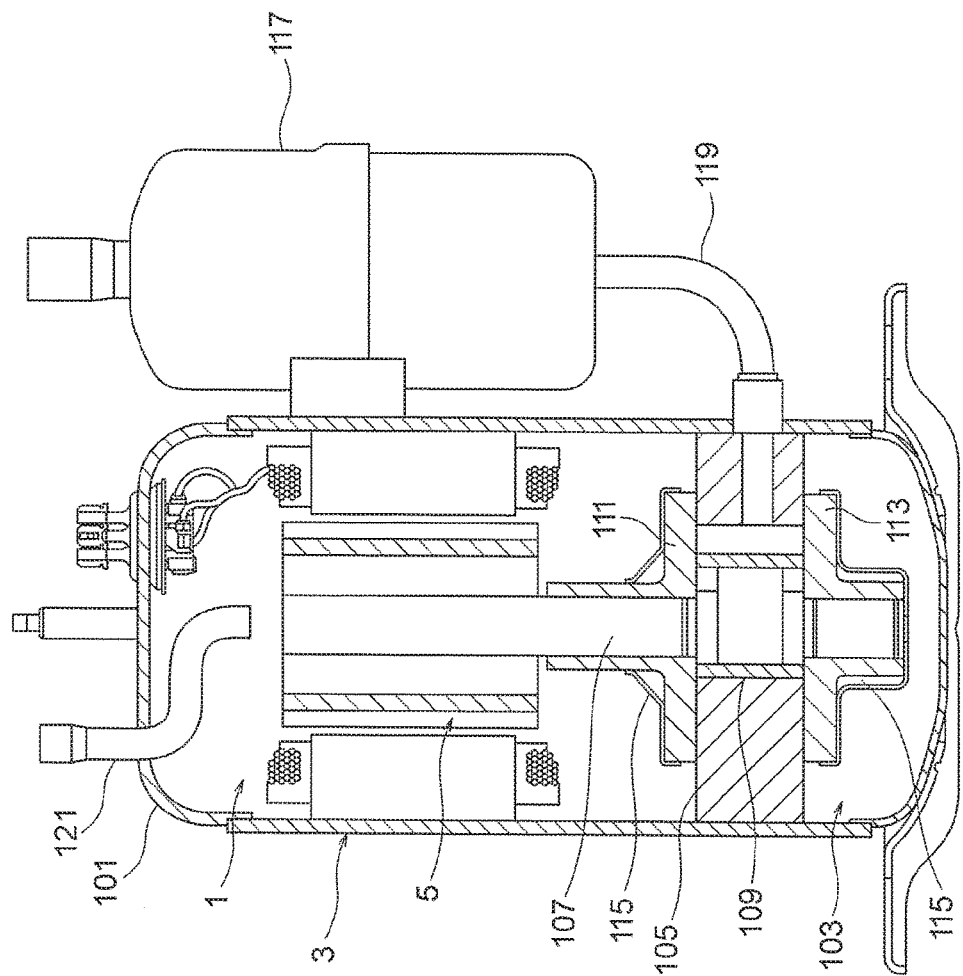
FIG. 10 is a vertical sectional view of a rotary compressor having the interior permanent magnet motor mounted therein.

FIG. 10 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as the shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. A coil of the stator 3 is supplied with power from a glass terminal fixed to the airtight container 101.

The rotor 5 is arranged through intermediation of the air gap on a radially inner side of the stator 3, and is held in a rotatable state by bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through air holes formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

As the refrigerant for the rotary compressor 100, R410A, R407C, R22, or the like that has hitherto been used may be used, but any refrigerant such as a refrigerant having a low global warming potential (GWP) may also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf ($CF_3CF=CH_2$) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Also in the rotary compressor according to the second embodiment constructed as described above, advantages similar to those of the above-mentioned first embodiment are obtained with the use of the above-mentioned interior permanent magnet motor.

Third Embodiment

Further, the present invention may be carried out as an air conditioning apparatus including the compressor of the above-mentioned second embodiment as a component of a refrigeration cycle. Note that, configurations of components other than the compressor in the refrigeration cycle of the air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST

1 interior permanent magnet motor, 3 stator, 5 rotor, 11 rotor core, 13 shaft, 19 permanent magnet, 21 magnet insertion hole, 25 core outer peripheral surface, 55 hole outer-side line, 72*a*, 72*b*, 72*c*, 72*d* slit, 73 slit inner-side line, 73*a* apex, 73*b*, 73*c* side end, 100 rotary compressor, 101 airtight container, 103 compression element, 105 cylinder, ML magnetic pole center line

The invention claimed is:

1. A rotor, comprising:
   a rotor core; and
   a plurality of permanent magnets, wherein
   the rotor core is formed by laminating a plurality of steel plates,
   the rotor core has a plurality of magnet insertion holes,
   at least one slit is formed between an outer peripheral surface of the core and an outer-side line of at least one of the magnet insertion holes,
   an end of the slit on the magnet insertion hole side has a triangular shape as viewed in a plane having a rotation center line as a normal,
   the triangular shape projects toward the magnet insertion hole side,
   the end of the slit on the magnet insertion hole side has an isosceles triangular shape,
   a slit inner-side line of the slit comprises:
      an apex of the triangular shape;
      two sides of the triangular shape, which form the apex; and
      a pair of side ends being ends opposite to the apex of the two respective sides,
   an interval between each of the pair of side ends of the slit and the magnet insertion hole is larger than an interval between the apex of the slit and the magnet insertion hole,
   the interval between the apex and the magnet insertion hole is larger than a plate thickness of each of the steel plates forming the rotor core, and
   the pair of slit side lines extend along the corresponding magnetic pole center line.

2. A rotor according to claim 1, wherein the plurality of permanent magnets and the plurality of magnet insertion holes are each formed into an arc shape that is convex toward a center side of the rotor.

3. An interior permanent magnet motor, comprising:
   a stator; and
   the rotor of claim 1, which is rotatably arranged so as to be opposed to the stator.

4. A compressor, comprising, in an airtight container:
   the interior permanent magnet motor of claim 3; and
   a compression element.

* * * * *